D. H. DEWEY.
Platform Scales.
No. 99,169.
Patented Jan. 25, 1870.
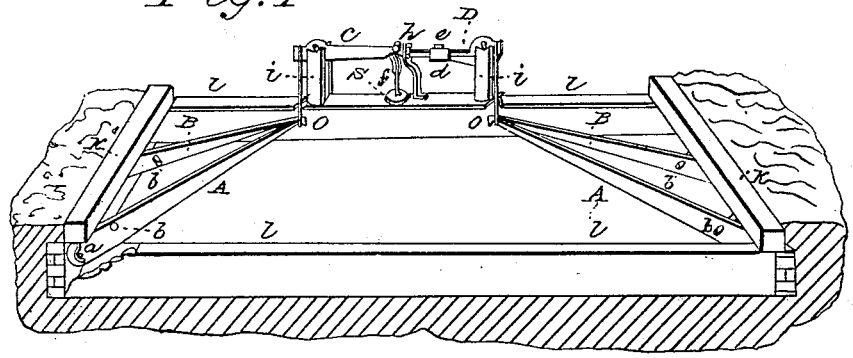
Witnesses
Inventor
Dan'l H. Dewey

United States Patent Office.

DANIEL H. DEWEY, OF CANTON, ILLINOIS.

Letters Patent No. 99,169, dated January 25, 1870.

IMPROVEMENT IN PLATFORM-SCALES FOR HAY OR CATTLE.

The Schedule referred to in these Letters Patent and making part of the same.

*To all whom it may concern:*

Be it known that I, DANIEL H. DEWEY, of the city of Canton, in the county of Fulton, and in the State of Illinois, have invented a new and useful Improvement in Hay or Cattle-Scales; and do hereby declare that the following is a full, clear, and exact description thereof, reference being had to the annexed drawings, making a part of this specification, in which like letters of reference refer to like parts, and in which—

Figure 1 represents a perspective view of scale, with platform removed.

Figure 2 is a plan view.

Figure 3 is a side elevation.

Figure 4 is a sectional end view of scale.

Figures 5 and 6 are views in detail of weigh-beams.

Figure 7 is a perspective view of cattle-frame and scales complete.

Like letters in the different figures of the drawings indicate like parts.

This improvement relates to the extension or elongation of the platform of such scales, by using the principal levers, A B, of a common seven and a half by fourteen feet scale, and placing them under each end of a scale seven and a half by twenty feet, (or by shortening the levers for a scale of ordinary length,) filling up the space between the vibrating-points $o$ $o$ of the said levers by weigh-beams C D, the united points of the latter being the connection and weighing-point of each set of levers, thus economizing the length of the principal levers, and, consequently, the weight of material.

Also, to the use herein of an adjustable cattle-pen, E F G, forming sides to the scale, by the inclining of which, hay may be weighed on an ordinary narrow scale, without removing the cattle-pen, or adjusting the balance.

To particularize, a similar form of lever, A B, to those in ordinary use in seven and a half by fourteen feet scales, and hung in the same manner and position under the ends of a platform of seven and a half by twenty feet in size, leaving about six feet between their points $o$ $o$.

The vibrating ends of either set of levers are suspended to the shorter arm of one of the two weigh-beams, C D, of the usual construction, said beams being pivoted at their points, one above the other, in the eyes $q\,r$, of perpendicular rods or hangers, $f$, which support the disk and weights $g$.

These rods $f$ are connected in the disk $g$, and are made thin in the middle part of their length, to admit of any lateral motion caused by the raising of the beams, and to avoid friction on the pivots.

The upper ends of rods, near the eyes $q\,r$, are so bent as to receive a pivot of each beam into a separate eye, and one above the other, without interference in balancing.

Further oscillation, either lateral or vertical, is prevented by a slotted guide, $h$, in which the ends of the beams oscillate, the guide being supported by the small platform which sustains the weigh-beams.

The connection of the points of weigh-beams may also be effected by making the end of one beam forked, or slotted horizontally, having a pivot on each fork, one above the other, the end of the other beam having one pivot, and hanging between the two points of the first, the former points being connected by two short links, and the weight-rod suspended from the lowest pivot.

One of the weigh-beams D is graduated to mark ten-pound divisions, and carries a sliding poise, $d$, with a weighted index, $e$, moving on a pivot on the top face of the poise, by which intervening fractions are indicated.

To make the scale subservient to the weighing of cattle, and at the same time to admit a load of hay on the scale, I erect a frame or pen, E F G, on both sides of the same, of convenient height, which is hinged to beams or sills, F, lying across the platform, level with the floor, and forming an integral part thereof, and extending laterally far enough to receive the ends of inclined braces G, fastened to the pen, near the top of the frame-post E.

The lower end of each brace slides in a slot or mortise in the end of the sills F, each brace having a suitable stop or button, $n$, or its equivalent, to adjust the frame to any desired inclination, according to the breadth of the load to be weighed.

The same construction of frame is used on both sides. Gates may be hung at both ends, to make the pen complete.

The advantages of my invention are—

First, economy of material and weight in the levers, by shortening them.

Second, obviates trussing the levers.

Third, saves labor and cost of deep pits and foundations.

Fourth, advantage of double purposes of hay and cattle-scale, without having to adjust balance or remove the pen.

Fifth, the obviating of the finer graduations on the beam, the index on the poise entirely filling the requirement, and indicating all fractions less than ten pounds.

Having thus fully described my invention,

What I claim therein as new, and desire to secure by Letters Patent, is—

1. In combination with the double platform-levers

A B, connected at their points *o o*, the scale-beams C D, the adjusting spring-rod or double hanger *f*, and the sliding poise *d*, having a pivoted graduating-index, *e*, arranged and operating substantially as described.

2. The adjustable cattle-pen, with swinging sides E E, having braces G, provided with stops *n*, in combination with sills F, substantially as described In testimony that I claim the foregoing, I have hereunto set my hand, this 10th day of September, 1869.

DANIEL H. DEWEY.

Witnesses:
H. W. WELLS,
EDMUND THURLOW.